United States Patent [19]

Cheng

[11] Patent Number: 5,584,397
[45] Date of Patent: Dec. 17, 1996

[54] STORAGE RACK FOR STORING COMPACT DISKS

[76] Inventor: Peter S. C. Cheng, 99 Glencairn Street, Toronto, Ontario, Canada, M4R 1M7

[21] Appl. No.: 539,549

[22] Filed: Oct. 5, 1995

[51] Int. Cl.[6] ........................................... A47F 7/00
[52] U.S. Cl. ..................................................... 211/40
[58] Field of Search .............................. 211/40, 41, 168, 211/59.2; 206/309; 312/9.15, 9.18

[56] References Cited

U.S. PATENT DOCUMENTS

| | | | |
|---|---|---|---|
| 5,344,028 | 9/1994 | Angele | 211/40 |
| 5,370,244 | 12/1994 | Peng | 211/40 |
| 5,439,119 | 8/1995 | Chow | 211/40 X |
| 5,524,976 | 6/1996 | Peng | 211/40 X |

*Primary Examiner*—Alvin C. Chin-Shue
*Assistant Examiner*—Sarah L. Purol
*Attorney, Agent, or Firm*—Kirschstein, et al.

[57] ABSTRACT

A compact disk storage and dispensing rack includes a base and, rising from the base in a use position of the rack, a support rod. A plurality of storage receptacles each for accommodating one of a plurality of compact disks is mounted on successive sections of the support rod for pivoting about mutually parallel axes along movement planes that are parallel to one another and inclined to a predetermined extent with respect to the horizontal as considered in the use position of the rack. Each of the storage receptacles is hollow and has a region that is remote from the support rod and is open to permit egress and ingress of the respective compact disk out of and into the respective receptacle. Each of the storage receptacles is movable between its storage position in which the remote region is situated higher and a dispensing position in which it is situated lower than the region surrounding the support rod. Each of the storage receptacles accommodates the respective compact disk with freedom of at least limited movement out of the other region and back so that the compact disk tends to slide out of the respective storage receptacle in the course of its movement towards its dispensing position. This movement is limited by respective detaining portions of the respective storage rack that are to be forced out of the path of movement of the disk during its ingress and particularly during its egress. A vertical wall serves as an abutment retaining the storage receptacles in their storage positions.

10 Claims, 3 Drawing Sheets

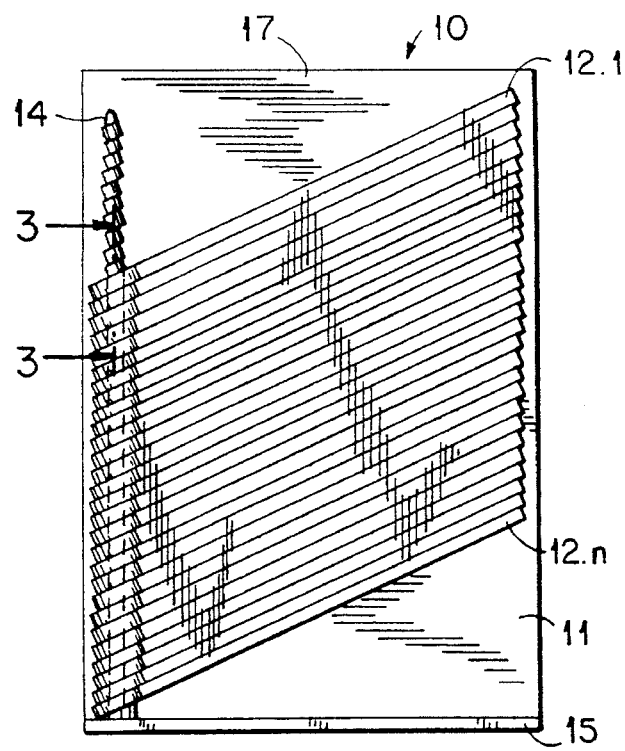
FIG. 1
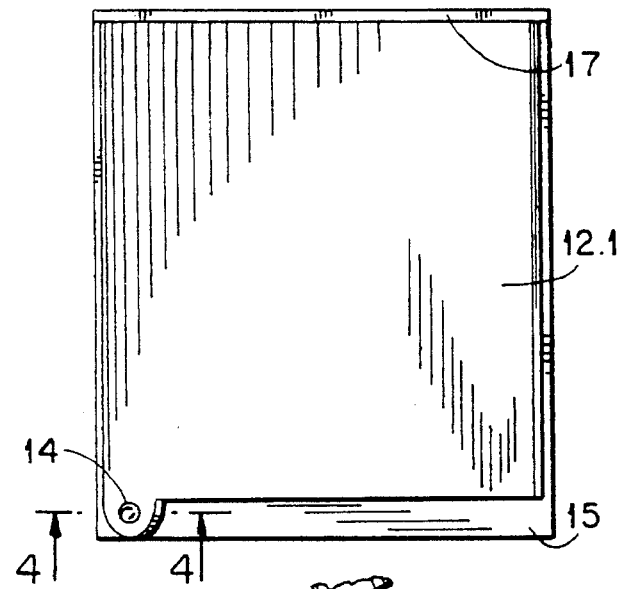
FIG. 2
FIG. 3
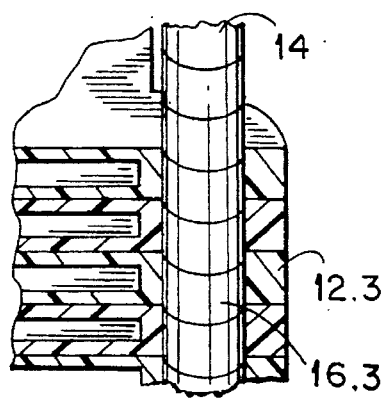
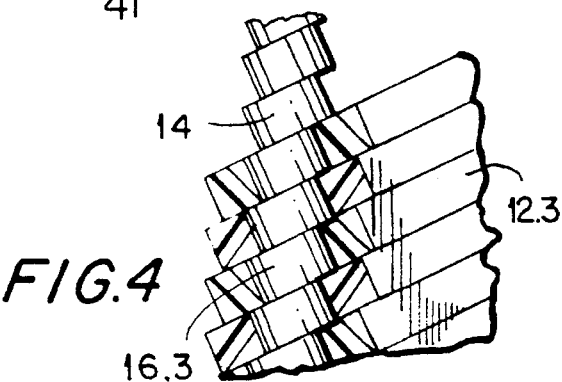
FIG. 4

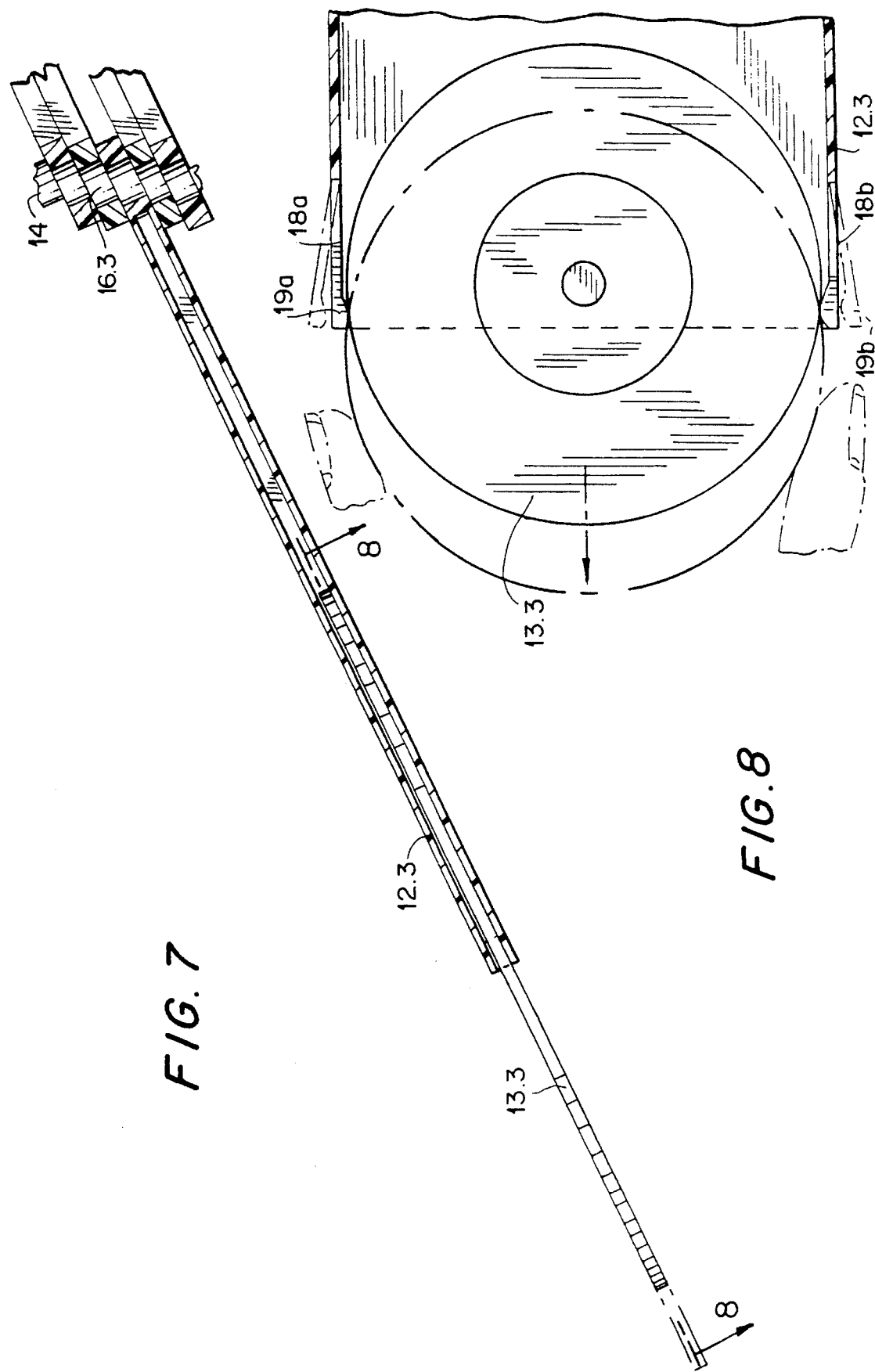

5,584,397

STORAGE RACK FOR STORING COMPACT DISKS

BACKGROUND OF THE INVENTION

1. Field of the Invention

The present invention relates to storage devices in general, and more particularly to a storage rack for storing a multitude of items, especially compact disks, individually in respective storage receptacles movably mounted on a stand component of the rack.

2. Description of the Related Art

There are already known various constructions of storage racks, among them such that are specifically designed for storing a multitude of phonograph records, or a multitude of audio or video cassettes, or even a multitude of so-called compact disks, whether they be of the music variety, of the laser disk kind, or of the so-called CD-ROM sort. In the category of compact disks, the typical approach used in the past was to propose a shelf-type structure of one configuration or another that contains a substantial number of compartments or bays each for accommodating usually just one so-called "jewel case", i.e. a box, usually of a transparent material, especially hard plastic, that is capable of accommodating and supporting a respective compact disk in a manner protecting the latter from damage even as the jewel case is being moved, sometimes in a not-too-gentle fashion, from one place to another. The reasoning behind this approach was that, since the use of such hard boxes is at least advantageous, if not indispensible, while the compact disks are still in the chain of commerce including the respective retail establishment at which the compact disks are on display in a manner that permits the prospective purchasers to handle the compact disks which are then still protected from damage by being contained in the respective jewel cases, the protective function of such jewel cases may as well be utilized even later, when the compact disk is already in the possession of its owner.

However, the jewel cases add additional expense to the production of the so protected compact disks and, therefore, the tendency is to package the disks, especially the CD-ROM disks that are ordinarily contained in cardboard boxes, together with instruction manuals or the like, in a less expensive manner. This, of course, means that the reliable damage protection provided to the disks by the jewel boxes is not extended to the owners any longer; yet, it would still be desirable to many owners to be able to store such disks in a similarly rugged fashion.

Of course, it would be possible for such owners to go out and buy empty jewel boxes by the dozen or any other number by which they are being offered. However, with the proliferation of CD-ROM borne programs, the availability of convenient storage space is becoming more and more of a problem. This situation has already been recognized before by others and some of them have proposed solutions to this problem. Among them, there were Jung-Ching Peng and Boris Angele who, in their respective U.S. Pat. Nos. 5,344,028 and 5,370,244, have proposed storage arrangements in which the compact disks are individually contained in respective storage receptacles which, in turn, are mounted on a storage stand and particularly on a shaft or rod that extends vertically upwardly from the base of the stand, for turning about the longitudinal axis of the rod. This provided for a certain amount of access to the respective receptacles and certainly to their contents. However, experience has shown that it is not an easy task in storage racks of this type especially to remove the respective compact disk from its receptacle, in that the proper gripping of the compact disk prior to its removal is impeded by the presence of various parts of the receptacles in the path of the gripping movement.

OBJECTS OF THE INVENTION

Accordingly, it is a general object of the present invention to avoid the disadvantages of the prior art.

More particularly, it is an object of the present invention to provide a compact disk storage rack that does not possess the drawbacks of the known storage racks of this type.

Still another object of the present invention is to devise a compact disk storage rack of the type here under consideration in which the handling of the compact disk during its removal from its associated receptacle is greatly facilitated relative to the known state of the art.

It is yet another object of the present invention to design the above storage rack in such a manner as to be able to accommodate a great number of the compact disks in an extremely limited amount of space.

A concomitant object of the present invention is so to construct the compact disk storage rack of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in a compact disk storage and dispensing rack that includes a base which is to be placed on a substantially horizontal surface in a use position of the rack, and a plurality of storage receptacles each for accommodating one of a plurality of compact disks. In accordance with the present invention, there is provided means for mounting each of the storage receptacles on the base for pivoting about mutually parallel axes along movement planes that are parallel to one another and inclined to a predetermined extent with respect to the horizontal as considered in the use position of the rack.

According to an advantageous feature of the present invention, the mounting means includes a support rod that extends substantially vertically as considered in the use position and has a plurality of individual rigidly connected consecutive sections each inclined to the aforementioned extent relative to the vertical as considered in the use position and each serving as a journal for an associated one of the storage receptacles. Each of the storage receptacles is hollow and has one region that surrounds an associated one of the sections of the rod and another region that is remote from the one region and is open to permit egress and ingress of the respective compact disk out of and into the respective receptacle. Moreover, each of the storage receptacles is movable between its storage position in which its other region is situated higher than the one region, and a dispensing position in which the other region is situated lower than the one region. Then, it is advantageous when each of the storage receptacles accommodates the respective compact disk associated therewith with freedom of at least limited movement out of the other region and back so that the compact disk tends to slide out of the respective storage receptacle in the course of its movement towards its dispensing position.

In accordance with a further advantageous facet of the present invention, there is further provided means for limiting the extent of movement of the respective compact disk out of the associated storage receptacle. Such limiting means advantageously includes a pair of detaining portions of the respective storage receptacle that are disposed across from one another at opposite ends of the other portion of the storage receptacle and extend into the path of movement of the respective compact disk through the other portion, the detaining portions exhibiting at least limited elastic yieldability to be able to be forced out of the way of the respective compact disk when an additional force besides gravity and inertial forces acts thereon in the sense of moving the same out of or into the storage receptacle through the other region of the latter. It is further to advantage when each of the detaining portions includes a nose, the two of which bulge toward one another to constrict the space available between the detaining portions for the passage of the respective compact disk.

It is particularly advantageous when, in accordance with another aspect of the present invention, the storage rack further includes means for retaining the storage receptacles in their storage positions against pivoting movement in one sense towards their dispensing position. Then, it is advantageous for the mounting means to be so disposed relative to the retaining means that the centers of gravity of the storage receptacles have to pass through their dead-center position when conducting pivoting movements in the other sense. In this context, it is particularly advantageous when the retaining means includes an abutment wall that is rigid with the base and extends substantially vertically upwardly therefrom as considered in the use position along one edge region of the base, and especially when all of the sections of the support rod are centered on respective mutually parallel axes that are all situated substantially in a common neutral plane and the neutral plane extends along an edge region of the base that is situated remotely from the one edge region and extends substantially parallel thereto.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side elevational view of a compact disk storage and dispensing rack of the present invention with all of its storage receptacles in their storage positions;

FIG. 2 is a top plan view of the storage and dispensing rack of FIG. 1;

FIG. 3 sectional view taken on line 3—3 of FIG. 1 through a fragment of the storage and dispensing rack, on a greatly enlarged scale;

FIG. 4 is a view similar to that of FIG. 3 but taken on line 4—4 of FIG. 2;

FIG. 7 is a cross-sectional view taken on lines 7—7 of FIG. 6 through the one dispensing receptacle and its immediate vicinity, on a scale substantially corresponding to that of FIGS. 3 and 4, and FIG. 8 is a sectional view, on a scale only slightly enlarged relative to that of FIG. 5, of a part of the one storage receptacle taken on line 8—8 of FIG. 7 and showing the compact disk accommodated therein in a top plan view and in solid lines immediately prior to, and in a broken line immediately after, its withdrawal from the one storage receptacle.

DETAILED DESCRIPTION OF THE PREFERRED EMBODIMENT

Figure 5:
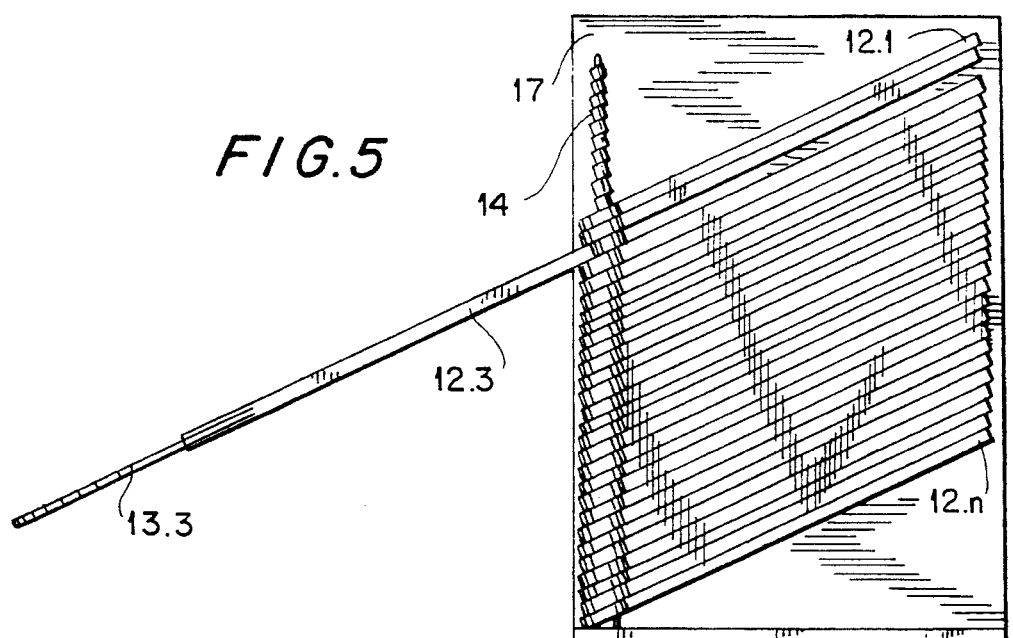
FIG. 5 is a view corresponding to that of FIG. 1 but showing a selected one of the storage receptacles of the compact disk storage and dispensing rack in its dispensing position, with a compact disk partially accommodated therein but protruding from it to a predetermined extent.

Referring now to the drawing in detail, and first to FIG. 1 thereof, it may be seen that the reference numeral 10 has been used therein to identify a compact disk storage and dispensing rack of the present invention in its entirety. The rack 10 includes, as its basic components, a stand 11 and a multitude of individual storage receptacles 12.1 to 12.n, wherein n is any relatively large number, preferably in excess of ten, fifteen or even more. The reason for providing this many of the storage receptacles 12.1 to 12.n is that the purpose of the rack 10 is to store in as little space as possible or feasible the very same number of compact disks 13.1 to 13.n (or fewer if the rack 10 is not filled to capacity). It should be understood that each of the storage receptacles 12.1 to 12.n is hollow and designed or dimensioned to accommodate one, and only one, of the compact disks 13.1 to 13.n of which, in order not to unduly encumber the drawing, only one is specifically shown at 12.3 (see, for instance, FIG. 5). However, it is to be understood that, depending on the circumstances of or expectations for use by the ultimate user, the number of the receptacles 12.1 to 12.n could be higher or lower than that shown; then, the storage rack 10 would be capable of storing a correspondingly greater or lesser number of the compact disks 13.1 to 13.n.

The storage rack 10 is also meant to provide, besides large-capacity storage, a convenient way for gaining individual access to any of the so stored compact disks 13.1 to 13.n, for taking the affected one of the disks 13.1 to 13.n out of the confinement of the associated one of the receptacles 12.1 to 12.n when needed, and for inserting the respective one of the compact disks 13.1 to 13.n for which there is no immediate demand any more into any then empty one of the storage receptacles 12.1 to 12.n, all that without disturbing the others of the receptacles 12.1 to 12.n to any meaningful extent, and especially without disrupting or interfering with their normal storage function.

Thus, if the rack 10 is to be used in a room of a private residence, which is a currently preferred one of the possibilities contemplated by the present invention, then this convenient dispensing feature is utilized to permit the owner of the compact disks 13.1 to 13.n in question to easily select the one he or she wishes to play, withdraw it from its "jacket" constituted by the respective one of the receptacles 12.1 to 12.n, play it, and then just as easily return it to its stored position on the storage rack 10.

In another potentially viable application of the storage rack 10 which, however, is probably much less likely to gain widespread use than the one discussed above, namely, at a compact disk distribution facility such as a record store, the compact disks such as 13.1 to 13.n, each preferably protected by a jacket of, say, transparent synthetic plastic material that completely and substantially conformingly surrounds the respective one of the compact disks 13.1 to 13.n, would be made available to the potential buyers on storage racks such as the rack 10 for easy access to them and easy removal, still in their protective jackets, from the respective receptacles such as one of those indicated at 12.1 to 12.n for perusal of the descriptive or promotional material accompanying the respective disk such as 13.3 and eventual transport of the selected one or more of the disks 13.1 to 13.n to the cashier for purchase.

It will be appreciated that, in either of the above-discussed situations, easy access to and equally easy reinoval of the respective coinpact disk 13.3 from the rack 10 (and/or its return to the rack 10) is, if not a virtual necessity, then a highly desirable alluring feature giving the rack 10 of the present invention a significant consumer appeal and other advantages over other racks not exhibiting such properties.

The above-discussed advantages of the novel rack 10 are accomplished by or attributable to a combination of expedients incorporated in it in accordance with the present invention. For one, the receptacles 12.1 to 12.n, while stacked on top of one another and supported on supporting rod 14 extending substantially vertically upwardly from a base or bottom wall 15 of the stand 11 of the rack 10 in the illustrated position of use of the rack 10, are caused to assume respective substantially parallel inclined positions both when in their storing positions illustrated in FIG. 1, for instance, and in their dispensing positions corresponding to that shown in FIG. 5 with respect to the storage receptacle 12.3 accommodating the compact disk 13.3.

As observation of FIGS. 3 and 4 in conjunction with one another and with the rest of the drawing will reveal, such inclined positions are the direct result of the fact that the upright supporting rod 14 consists of a succession of consecutive cylindrical sections such as 16.3 that are rigid with one another and individually centered on preferably mutually parallel axes that are inclined by a predetermined angle within a common neutral plane with respect to the substantially vertically extending overall longitudinal axis of the red 14. The individual receptacles such as 12.3 are each supported on one of such rod sections such as 16.3 that serves as a journal therefor, so that the aforementioned inclination of the rod sections such as 16.3 is imparted to or imposed on the receptacles 12.1 to 12.n. In other words, the receptacles 12.1 to 12.n are confined to movements in mutually parallel movement planes that exhibit the above-mentioned inclination with respect to the horizontal.

As will be explained later, the position of the aforementioned neutral plane (i.e. the plane defined by the individual section axes and the overall rod axis), as well as the inclination angle, are carefully chosen to achieve the goals and advantages of the present invention. For the time being, it is sufficient to mention that the region of the respective receptacle such as 12.3 that is remote from the rod 14 is somewhat higher than the region surrounding the respective rod section such as 16.3 in the aforementioned storage position, and somewhat lower in the dispensing position. Both of these aspects bring about respective advantages that will also be presented later. This is also a convenient time and place to mention that the stand 11 of the storage rack 10 includes, besides the bottom wall 15, a substantially vertically extending wall 17 that is rigid and/or integral with the bottom wall 15 and, in accordance with another important facet of the present invention, serves as an abundant for the receptacles 12.1 to 12.n at least in their storage positions. This, too, will be addressed later.

Figure 6:
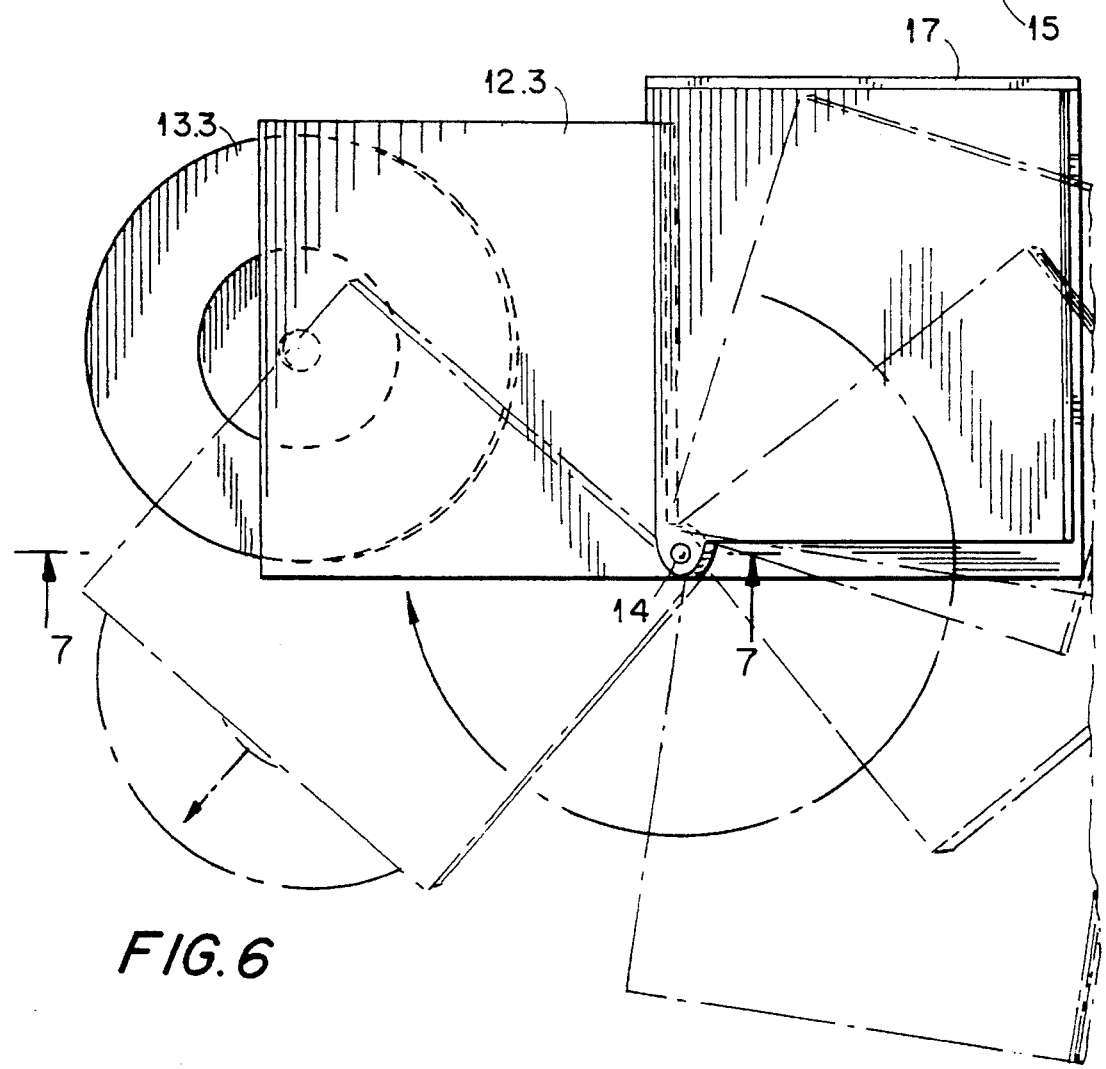
FIG. 6 is a top plan view of the storage and dispensing rack of the present invention in its condition illustrated in FIG. 5 but also showing the one storage receptacle in phantom lines in several intermediate positions intervening between its storage and dispensing positions.

As may be observed especially in FIG. 6 of the drawing, the respective storage receptacle 12.3 can be turned about the rod 14 between its end (storage and dispensing) positions through a multitude of intermediate positions indicated there by respective broken lines. FIG. 6 of the drawing also shows that, as the respective storage receptacle 12.3 moves in a direction indicated by an arrow towards its dispensing position shown in solid lines, the compact disk 13.3 gradually emerges out of its confines until, finally, in the dispensing position, it is almost half-way out of the receptacle 12.3. This means that it can be easily grabbed by the potential purchaser or owner, at least in the latter case, when the compact disk 13.3 is not necessarily contained within a protective jacket or sheath, by the central portion that contains no pre-recorded information so that it is not vulnerable in the sense that any fingerprints, smudges or even scratches made or left on it a result of such gripping will not have any deleterious effect on the quality of the information retrieved from the disk 13.3, in that even that central portion is readily accessible so that the person intent on manipulating the particular disk 13.3 in one way or another can altogether avoid touching the vulnerable data-bearing portion of the disk 13.3 that surrounds the aforementioned central portion.

This sliding of the respective disk 13.3 out of its receptacle 12.3 is fully automatic in most cases so that there is no need for the user to touch the respective disk 13.3 until after it has emerged out of the receptacle 12.3 to the extent illustrated in FIG. 6. This automatic sliding out, which is indicated in FIG. 6 by a straight arrow-headed broken line, is the direct result of the increasing negative inclination of the receptacle 12.3 as it approaches its dispensing position after its center has passed through a plane perpendicular to the neutral plane, and of the only limited friction between the compact disk 13.3 and the surface or surfaces on which it rests when received in the respective receptacle 12.3.

It will be appreciated that this phenomenon has exactly the opposite effect when the inclination of the respective receptacle 12.3 is positive, i.e. when the center of the receptacle 12.3 is on the other side of the aforementioned perpendicular plane. In that case, the increasing inclination of the receptacle 12.3 as it approaches its storage position (or the position in which its center would be in the neutral plane) would cause the respective disk 13.3 to slide deeper into the associated receptacle 12.3 if it was not in that position to begin with. The same phenomenon, however, causes the respective disk 13.3 to remain in the associated receptacle 12.3 no matter what forces or vibrations the stand may be subjected to, so long as the center of the respective receptacle 12.3 remains on the "up" side of the above-mentioned perpendicular plane.

It should be self-evident that this latter proviso is not satisfied automatically; rather, inasmuch as the only stable position that the respective receptacle 12.3 can assume is that in which its center of gravity is on the "down" side of the perpendicular plane and in the neutral plane (i.e. that corresponding to the dispensing position), it is necessary to take steps aimed at assuring that the receptacles 12.1 to 12.n will not follow their natural tendency to move to their only stable condition, even if handled by the user of the rack or peruser of its contents in a less than apt fashion. And this is where the vertical wall 17 comes in: it serves as an abutment for each and every one of the storage receptacles 12.1 to 12.n in its storage position.

As is perceivable from the drawings, especially from consideration of FIGS. 3, 4 and 6 in conjunction with one another, in the illustrated construction of the rack 10 the aforementioned neutral plane is substantially parallel to the vertical abutment wall 17, extending along an edge of the base wall or platform 15 from which the abutment wall 17 rises. This, of course, means that, when the respective receptacle such as 12.3 is in its storage position (i.e. the solid-line end position of FIG. 6 that is reached by turning it around the axis of the rod 14 in the counterclockwise direction until abutment with the vertical wall 17), not only does the abutment wall 17 prevent its further movement in the counterclockwise direction toward its stable position, but also any possibility of its spontaneous or otherwise unintended movement toward its stable dispensing position in the clockwise direction is virtually eliminated by the fact that its center of gravity is beyond "dead center", i.e. to the left of the neutral plane as considered in FIG. 6; as a matter of fact, the gravity center is situated so far away from the neutral plane that, short of a catastrophic event such as an earthquake or toppling over the rack 10 due to collision with or inattentive or inappropriate handling by a human being or animal, all of the receptacles 12.1 to 12.n that are in their storage position at any particular moment in time will remain there even as one of them, such as 12.3, is being pulled out from between them as it is being displaced by the user toward its dispensing position.

Thus, there is no need to fear that a sufficient number of the storage receptacles 12.1 to 12.n to cause the rack 10 to topple would accidentally reach or be in their dispensing positions at the same time and, consequently, to extend the platform 15 much beyond the projection of the receptacle stack into a horizontal plane, as indicated in FIG. 2 of the drawing. However, should it be surmised that a consequential number of potential users, out of bad habit, inattentiveness or even maliciousness would have the tendency to "accumulate" the storage receptacles 12.1 to 12.n in their dispensing positions, one or both of the major dimensions of the platform 15 could be increased to eliminate the possibility of toppling of the rack 10 due solely to the effect of the cumulative weight of the storage receptacles 12.1 to 12.n (and/or the disks 13.1 to 13.n partially received therein) that assume their dispensing position at a given time.

As mentioned before, the gradually increasing negative inclination of the respective receptacle 12.3 as it approaches its dispensing position eventually causes the respective disk 13.3 contained therein to commence its movement out of the confines of the associated receptacle 12.3. Now, it could be assumed that the person who had caused the receptacle 12.3 to move toward and into its dispensing position would be positioned in such a manner relative to the rack 10 as to be able to stop the respective disk 13.3 from moving out of the associated receptacle 12.3 to an excessive or even full extent, and thus protect the disk 13.3 from becoming damaged, for instance by encounter with the floor. However, it is best not to rely on the attentiveness of the users.

Therefore, as shown in FIG. 8 of the drawing again with respect to the receptacle 12.3, each of the receptacles 12.1 to 12.n is provided at its open region through which the respective disks 13.1 to 13.n are to be withdrawn from (or introduced into) the receptacles 12.1 to 12.n with a pair of detaining portions indicated at 18a and 18b in FIG. 8 of the drawing. Each of the detaining portions 18a and 18b carries an inwardly projecting bulge or nose 19a and 19b, respectively, wherein inwardly is intended to mean toward the center of the respective receptacle such as 12.3. Moreover, the detaining portions 18a and 18b (or at least their noses 19a and 19b) are resiliently yieldable in the outward direction (away from the center of the respective storage receptacle such as 12.3).

As a result of these expedients, the automatic sliding-out motion of the respective compact disk such as 13.3 is terminated once it comes in contact with and usually becomes wedged between the noses 19a and 19b. Any further progress of the compact disk 13.3 in that direction can occur only as a result of deliberate action on the part of the prospective user who must engage the disk 13.3, preferably by either gripping its generally invulnerable central portion as mentioned before or, better yet, by engaging merely the outer periphery of the disk 13.3 as indicated in phantom lines in FIG. 8, and actually pull the disk 13.3 out of the receptacle 12.3, overcoming the resistance of the portions 18a and 18b and/or their noses 19a and 19b in the process, and causing each of them to temporarily yield in the outward direction.

Of course, this resistance will have to be overcome as the respective disk such as 13.3 is introduced into the associated receptacle such as 12.3 as well, but this is not that critical in that case because the user is poised to push the disk 13.3 into the receptacle 12.3 in any event, and the relatively small amount of additional resistance encountered in the course of this operation will not act as a deterrent; rather, in most cases, it will merely be an indication to the user that he or she is "on the right track", i.e. that the introduction process is proceeding as intended.

It will be understood that each of the elements described above, or two or more together, may also find a useful application in other types of constructions differing from the type described above.

While the present invention has been described and illustrated herein as embodied in a specific construction of a storage rack for compact disks, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the genetic or specific aspects of this invention and, therefore, such adaptations should and are intended to be comprehended within the meaning and range of equivalence of the following claims.

What is claimed as new and desired to be protected by Letters Patent is set forth in the appended claims:

1. A compact disk storage and dispensing rack, comprising:
    a) a base to be placed on a substantially horizontal surface in a use position of the rack;
    b) a plurality of storage receptacles each for accommodating one of a plurality of compact disks; and
    c) means for mounting each of said storage receptacles on said base for pivoting about mutually parallel axes along movement planes that are parallel to one another and inclined to a predetermined extent with respect to the horizontal as considered in said use position of the rack.

2. The storage rack as defined in claim 1, wherein said mounting means includes a support rod that extends substantially vertically as considered in said use position and has a plurality of individual rigidly connected consecutive sections each inclined to the aforementioned extent relative to the vertical as considered in said use position and each serving as a journal for an associated one of said storage receptacles.

3. The storage rack as defined in claim 2, wherein each of said storage receptacles is hollow and has one region that surrounds an associated one of said sections of said rod and another region that is remote from said one region and is open to permit egress and ingress of the respective compact disk out of and into the respective receptacle; and wherein each of said storage receptacles is movable between its storage position in which said other region thereof is situated higher than said one region, and a dispensing position in which said other region is situated lower than said one region.

4. The storage rack as defined in claim 3, wherein each of said storage receptacles accommodates the respective compact disk associated therewith with freedom of at least limited movement out of said other region and back so that said compact disk tends to slide out of the respective storage receptacle in the course of its movement towards its dispensing position.

5. The storage rack as defined in claim 4, and further comprising means for limiting the extent of movement of the respective compact disk out of the associated storage receptacle.

6. The storage rack as defined in claim 5, wherein said limiting means includes a pair of detaining portions of the respective storage receptacle that are disposed across from one another at opposite ends of said other portion of said storage receptacle and extend into the path of movement of the respective compact disk through said other portion, said detaining portions exhibiting at least limited elastic yieldability to be able to be forced out of the way of the respective compact disk when an additional force besides gravity and inertial forces acts thereon in the sense of moving the same out of or into said storage receptacle through said other region of the latter.

7. The storage rack as defined in claim 6, wherein each of said detaining portions includes a nose that bulge toward one another to constrict the space available between said detaining portions for the passage of the respective compact disk.

8. The storage rack as defined in claim 2, and further comprising means for retaining said storage receptacles in said storage positions thereof against pivoting movement in one sense towards their dispensing position; and wherein said mounting means is so disposed relative to said retaining means that the centers of gravity of said storage receptacles have to pass through their dead-center position when conducting pivoting movements in the other sense.

9. The storage rack as defined in claim 8, wherein said retaining means includes an abutment wall that is rigid with said base and extends substantially vertically upwardly therefrom as considered in said use position along one edge region of said base.

10. The storage rack as defined in claim 9, wherein all of said sections of said support rod are centered on respective mutually parallel axes that are all situated substantially in a common neutral plane; and wherein said neutral plane extends along an edge region of said base that is situated remotely from said one edge region and extends substantially parallel thereto.

* * * * *